Figure 1:
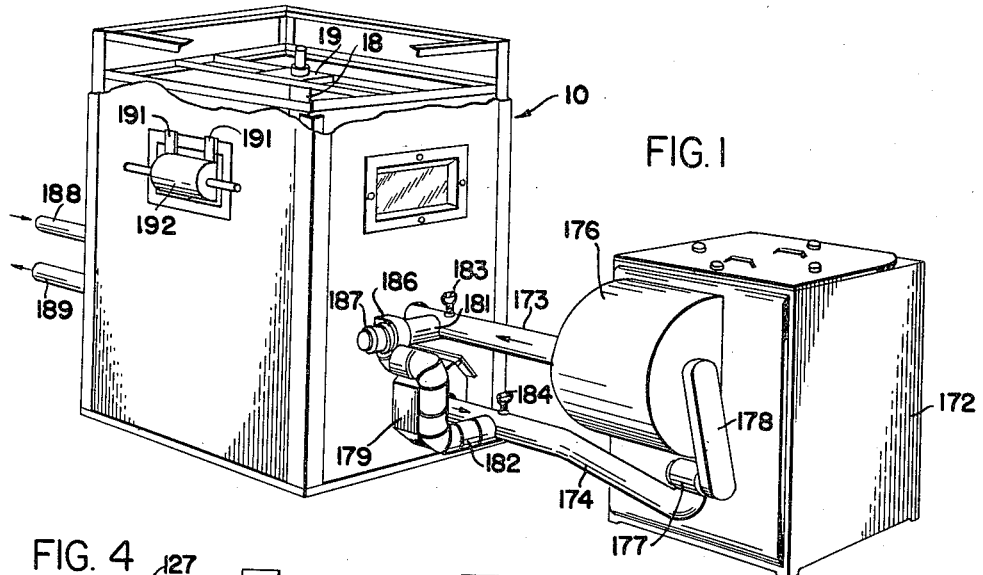

May 31, 1955

J. KOCH ET AL 2,709,359

MACHINE FOR SELECTIVELY TESTING THE
EFFECTS OF WEATHERING ON RUBBER

Filed April 1, 1952

9 Sheets-Sheet 1

INVENTORS
JOSEPH KOCH
EARL W. FORD
BY

ATTORNEYS

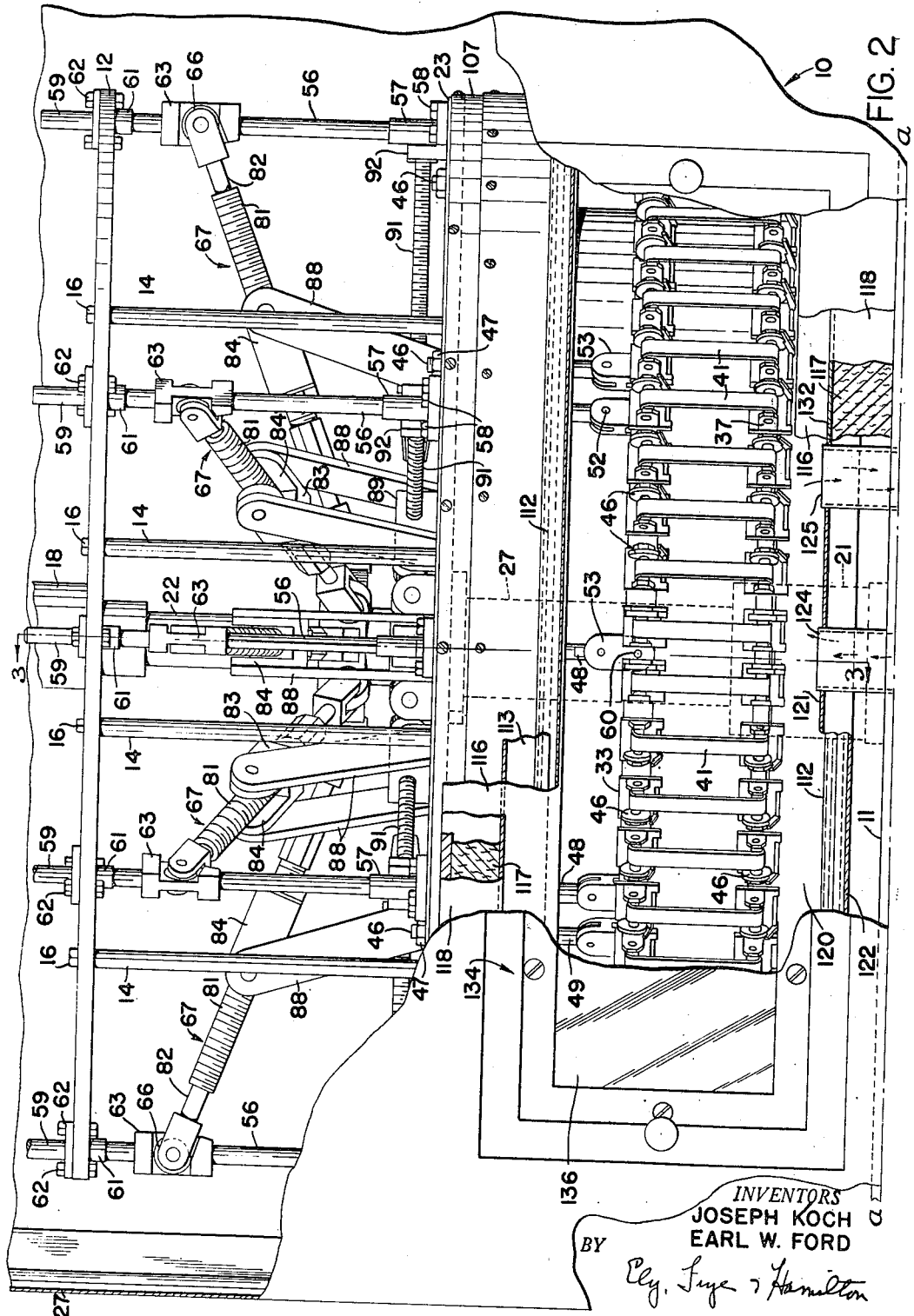

May 31, 1955

J. KOCH ET AL 2,709,359

MACHINE FOR SELECTIVELY TESTING THE
EFFECTS OF WEATHERING ON RUBBER

Filed April 1, 1952

9 Sheets-Sheet 3

INVENTORS
JOSEPH KOCH
EARL W. FORD

BY Olp, Frye & Hamilton

ATTORNEYS

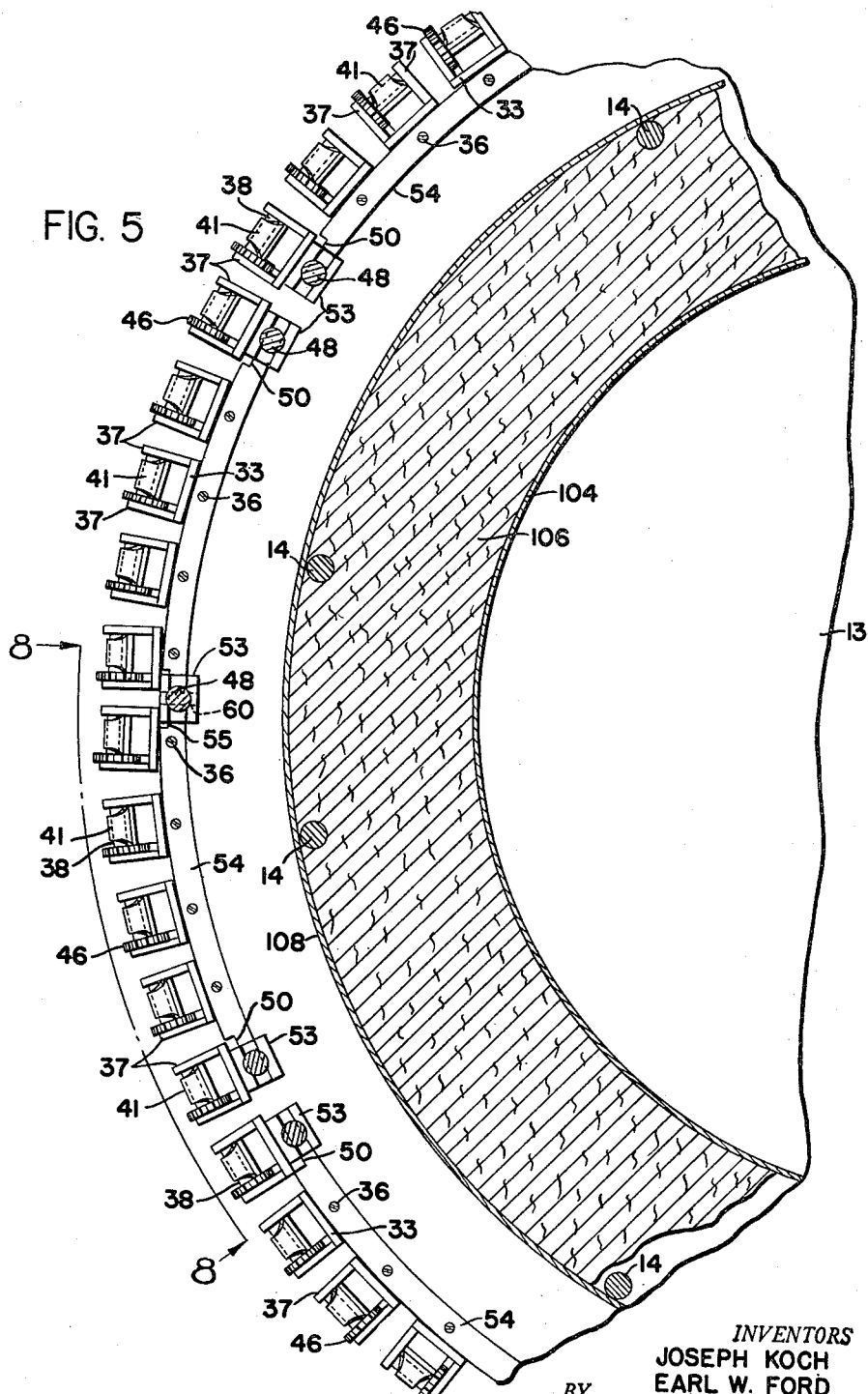

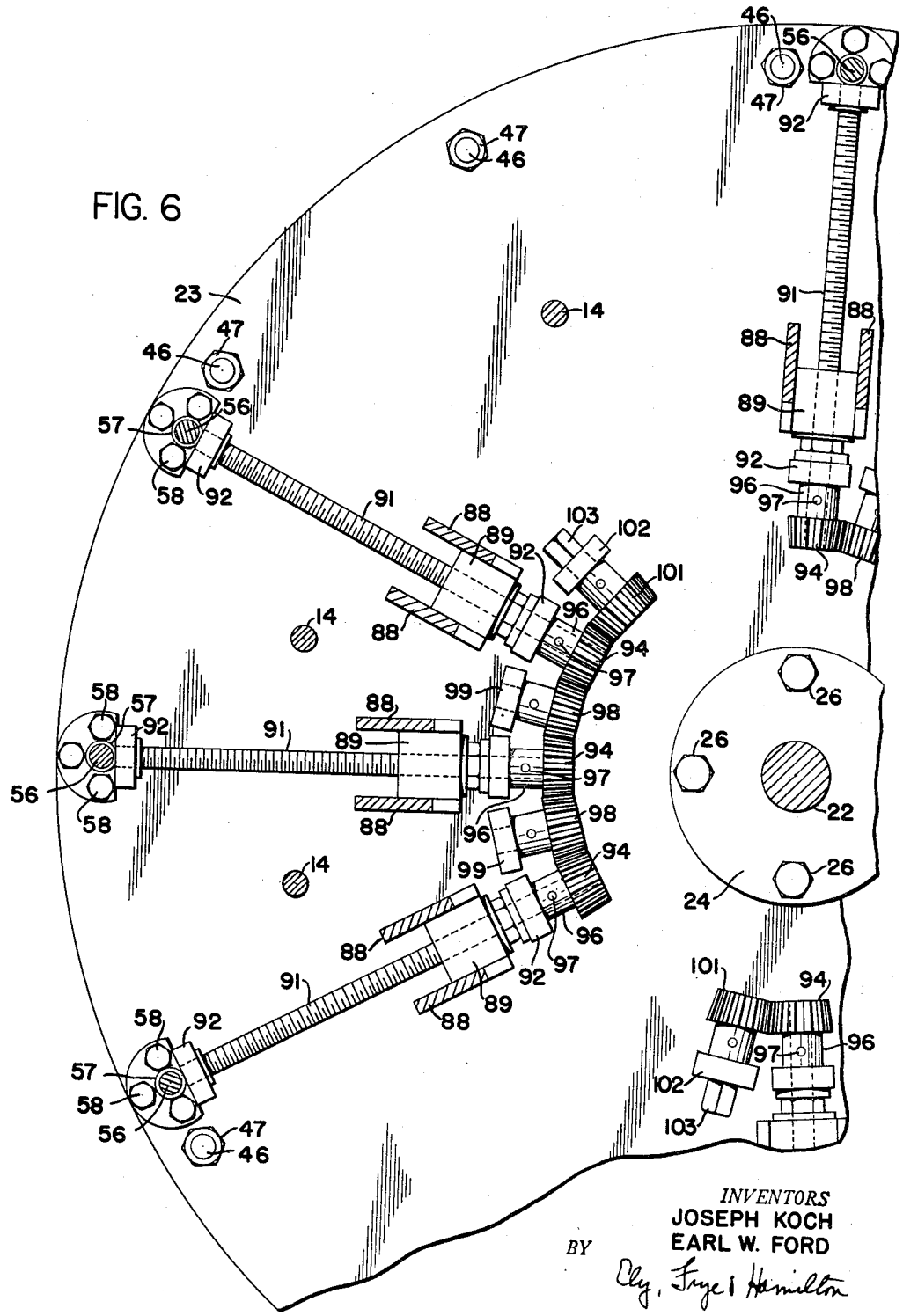

INVENTORS
JOSEPH KOCH
EARL W. FORD
BY
ATTORNEYS

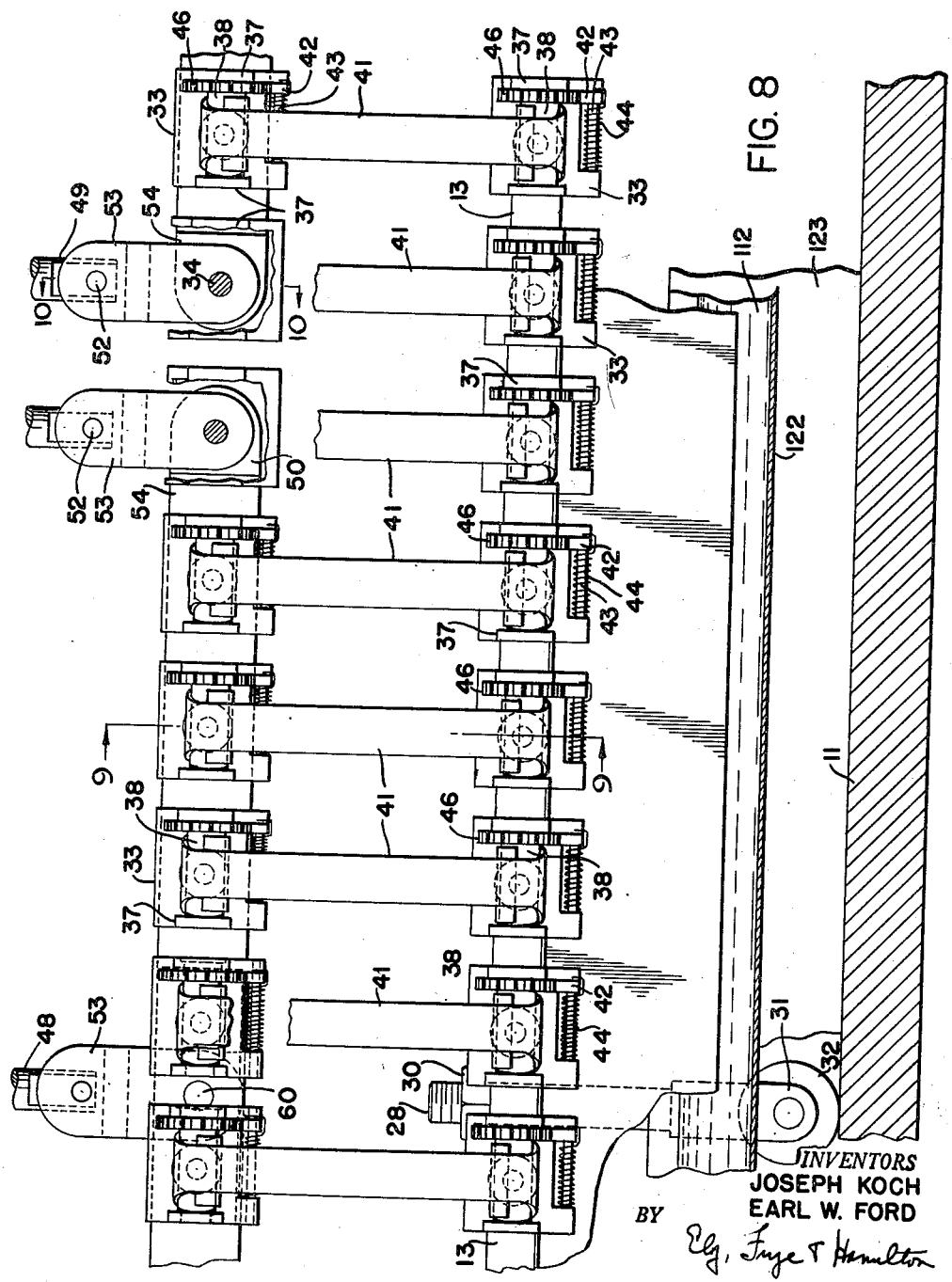

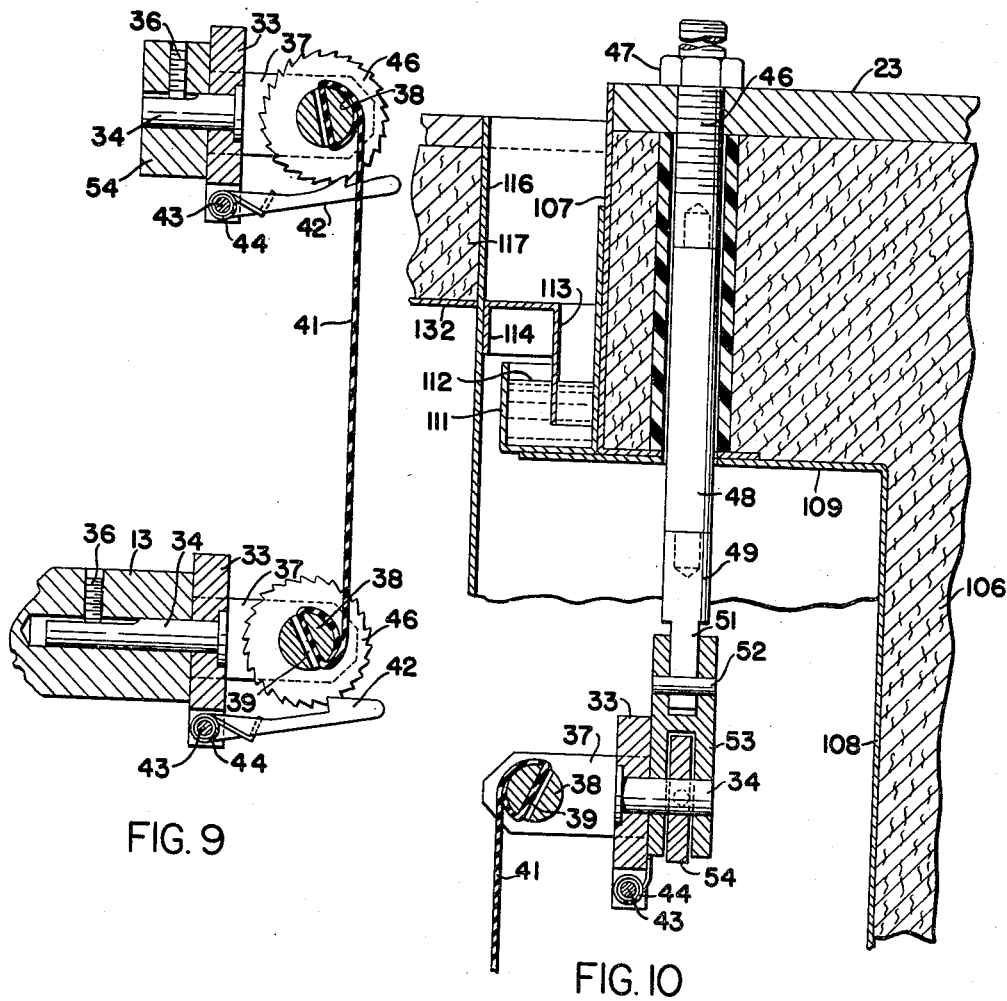

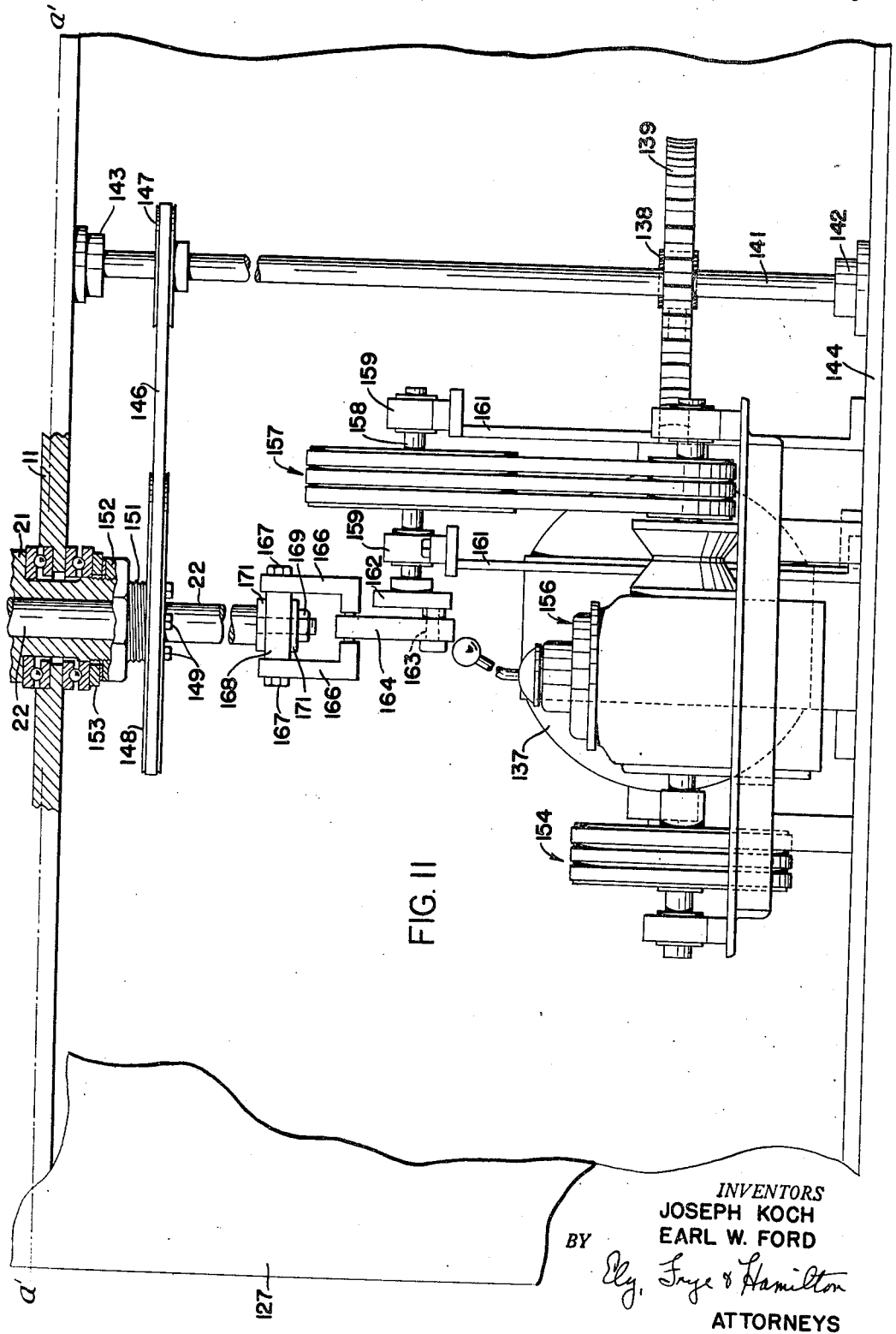

United States Patent Office 2,709,359
Patented May 31, 1955

2,709,359

MACHINE FOR SELECTIVELY TESTING THE EFFECTS OF WEATHERING ON RUBBER

Joseph Koch, Wadsworth, and Earl William Ford, Akron, Ohio, assignors to The Firestone Tire & Rubber Company, Akron, Ohio, a corporation of Ohio Application April 1, 1952, Serial No. 279,728

4 Claims. (Cl. 73—15.6)

This invention relates to a machine for testing rubber or the like materials, in which the factors entering into the deterioration of the material by weathering are controlled and in which samples of the material may be simultaneously subjected to different degrees of deformation, both static and cyclic.

It is well known that most rubber products exhibit a cracked or "crazed" appearance after exposure to the atmosphere for some time. This condition is especially pronounced in articles which are under strain or flexed, either continuously or intermittently, and is undesirable from the standpoint of serviceability as well as of appearance.

This cracking of the surface of rubber products has been variously ascribed to the effects of oxygen or ozone, light (including ultra-violet light), temperature variations, and moisture. These four factors, considered as a whole, constitute what is commonly known as the "weather." Thus the cracking of the surface of rubber products, as well as of other products, has come to be known as "weathering." Any attempt to eliminate or reduce the exposure cracking of such products would require an analysis of the separate effects of each factor suspected.

Many experimental methods have been used for studying the effects of weathering. Probably the first method tried in these studies was the simple outdoor weathering test, in which rubber samples of various shapes and held at various elongations were exposed directly to the atmosphere. Sometimes the exposure was conducted completely in the open and at other times under a protecting roof. The samples were usually tested at static elongations only. The results, for the most part, were inconclusive because the long period of time required for the tests involved seasonal changes, affecting all of the factors and affecting each in different degree. The fact that the samples were tested only under static elongation also introduced departure between experiment and practice.

It has also been attempted to study the effect of light, using a carbon arc light and filters. However, both the arc and ultra-violet light given out by it are sources of ozone, the rate of output of which is uncontrolled, and the arc is a source of heat, which makes the results of such tests questionable.

By the present invention, it is possible to separately apply and control each supposed "weathering" factor at a fixed value, and to eliminate or materially reduce cross-effects such as the heating of the surface by light and the variation of ozone due to generation by ultra-violet light, or to its reduction by elevated temperatures or by humidity. The invention provides a completely independent control of ozone concentration, light intensity and wave length, temperature and moisture, as well as providing for testing static and dynamic samples of one or several stocks concurrently over a range of elongations.

Briefly described, the apparatus to accomplish the foregoing comprises a housing having a rotary mounting for test specimens, the latter moving in a circular path through an insulated annular chamber in which the atmosphere may be controlled, the mounting for the specimens including means for elongating certain specimens by an oscillatory movement occasioned by reciprocation along the axis of the rotary mounting. In association with the housing are conduits leading, respectively, from an ozone control system, a hot air supply, a cold air supply, and a moisture supply. In addition to these, a mounting for a lamp at a window in the housing provides for intermittent exposure of the samples to light of selected wave length and intensity as the specimens revolve.

It is, therefore, an object of the invention to provide an apparatus for subjecting specimens of rubber or the like to weathering factors with complete selectivity and control. A further object is to accomplish the foregoing object simultaneously on specimens of the same or different stocks and under varying degrees of elongation, for both static and cyclically elongated samples.

Figure 4:
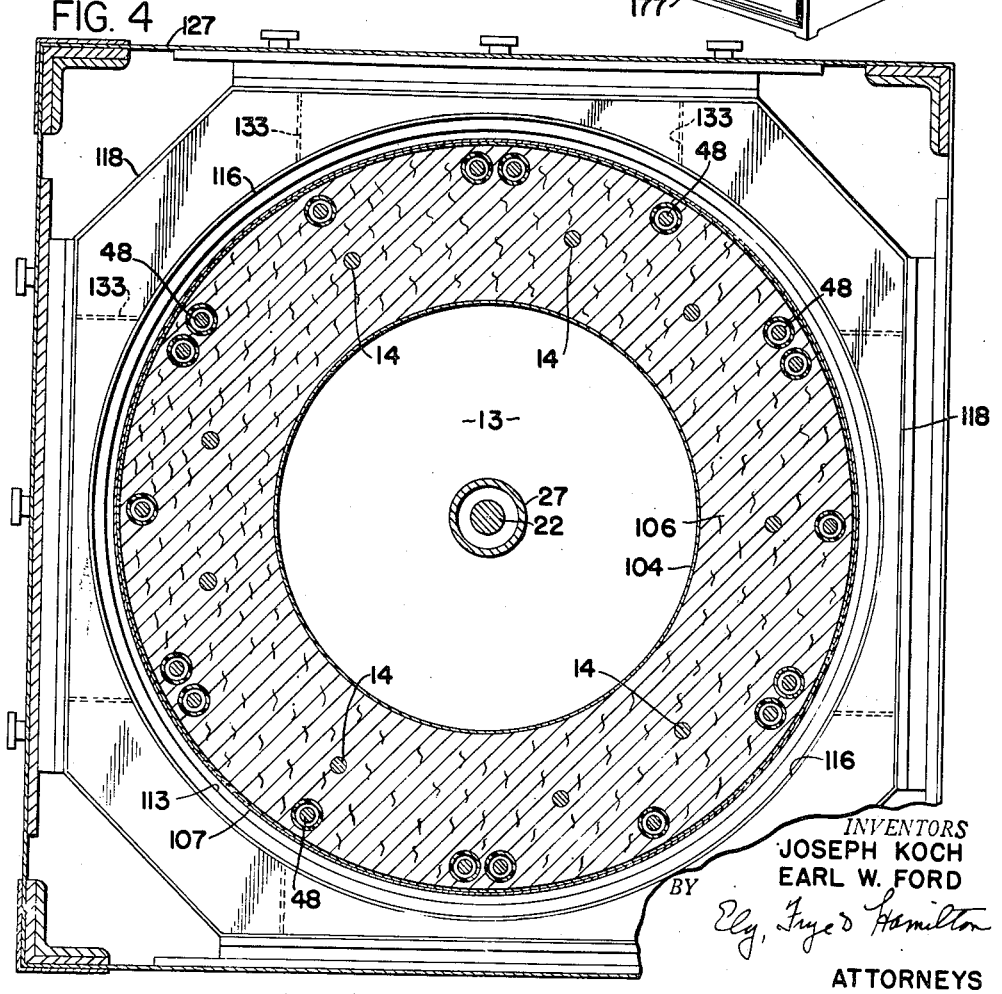
Figure 3:
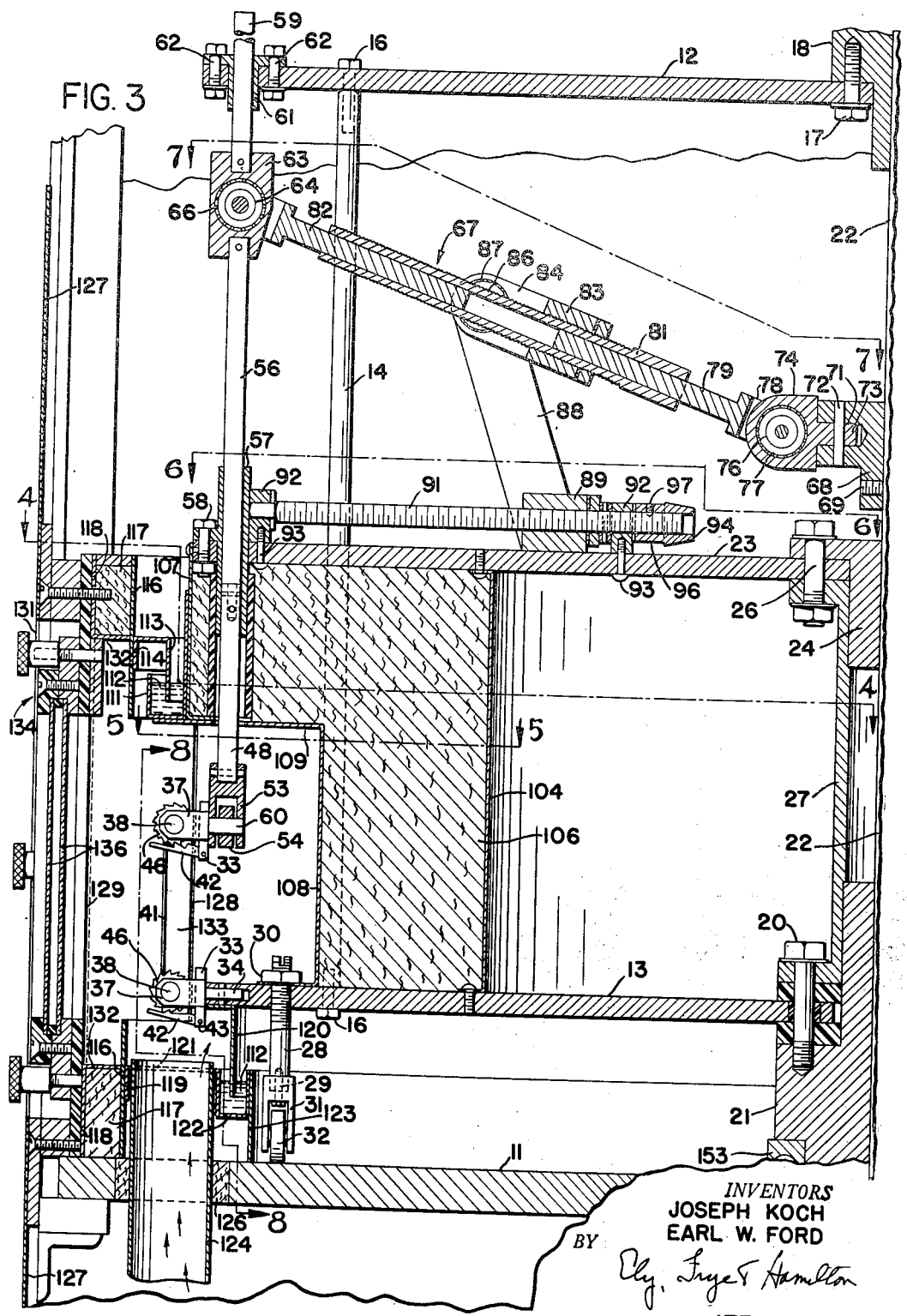
Figure 7:
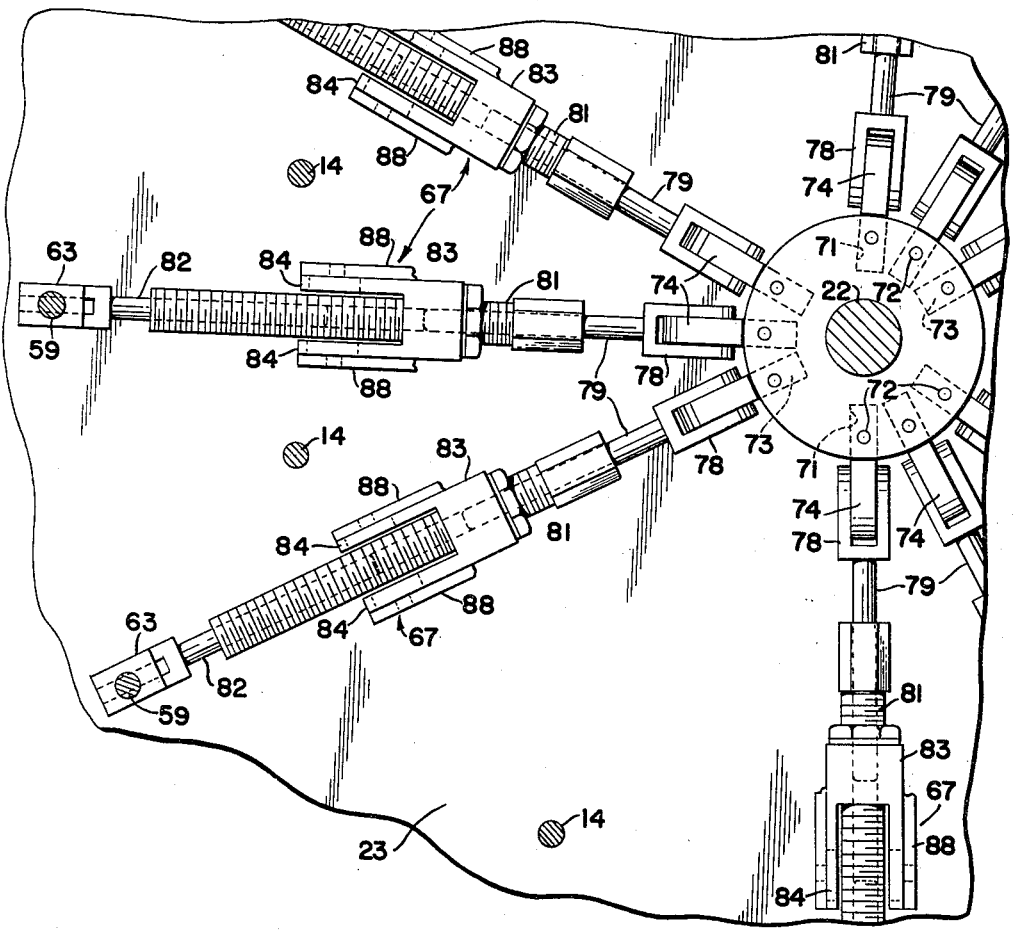

In the drawings:

Fig. 1 is a perspective view of the exterior of the cabinet housing the apparatus, as seen from the back and one side thereof, together with auxiliary equipment for use in regulating temperature, the top of the cabinet being broken away to show an upper journal mounting, Fig. 2 is a front view of the upper half of the test cabinet, with the outer wall partly removed to show interior parts, Fig. 3 is a sectional view taken on the line 3—3 of Fig. 2, Fig. 4 (adjacent Fig. 1) is a sectional view taken on the line 4—4 of Fig. 3, Fig. 5 is a sectional view, taken on the line 5—5 of Fig. 3, Fig. 6 is a view, partly in section, taken on the line 6—6 of Fig. 3, Fig. 7 is a view, partly in section, taken along the line 7—7 of Fig. 3, Fig. 8 is a view, partly in section, taken along the lines 8—8 of Figs. 3 and 5, Fig. 9 is a sectional view taken along the line 9—9 of Fig. 8, Fig. 10 is a sectional view, taken along the line 10—10 of Fig. 8, and Fig. 11 is a front view of the lower half of the test cabinet, with the outer wall removed to show interior parts, this figure being joined to the structure of Fig. 2 along the line a—a.

Referring to the drawings by characters of reference, there is shown in Figs. 1 and 2, a cabinet 10, of generally rectangular construction, which encloses the turntable carrying the specimen mountings in its upper portion (Fig. 2) and the power drive means in its lower portion (Fig. 11).

Referring to Fig. 3, the cabinet 10 is divided into upper and lower compartments by a partition 11, which provides the lower journal for the turntable shaft and also provides a track for the rollers furnishing radially outboard support for the turntable, as will appear hereinafter. As best seen in Fig. 3, the turntable comprises an upper disc 12 and a lower disc 13 connected by a series of peripherally spaced, vertical tie rods 14 secured by cap screws 16 threaded into their ends. Upper disk 12 is secured by cap screws 17 to a hollow bushing 18, externally journaled in a block 19 on a cross bar at the top of the cabinet (Fig. 1), and lower disc 13 is secured by cap screws 20 to a hollow bushing 21, supporting partition 11. Hollow, or tubular, bushings 18 and 21 are axially aligned and their central bores receive a shaft 22 for axially reciprocating motion, which motion is communicated to certain of the test samples, as will appear.

An intermediate disc 23 provides an upper support for certain of the test samples, and also as a support for elements involved in the flexing of other samples. A third bushing 24 surrounding reciprocating shaft 22 is secured to disc 23 by bolts 26. Screws 20 and bolts 26 also secure a flanged cylinder 27 which acts as a central spacer between discs 13 and 23. A series of depending studs 28, threaded into lower disc 13 at spaced points near the periphery thereof, carry by means of screws 29, forks 31 in which are journaled rollers 32, which roll on partition 11 as the turntable rotates, to furnish outboard support therefor. Lock nuts 30 hold the studs in proper alignment so that the rollers are directed tangentially.

The samples which remain at a fixed elongation during testing are located on the turntable in alternate sectors, each extending for 60° of arc, that is in three groups, and the samples which are cyclically elongated during test are located in the other three sectors.

All samples are attached at their lower ends to means carried by the lower disc 13. In each case, these means each comprise (Fig. 9) a plate 33 carrying a pin 34 which is inserted in the peripheral edge of disc 13, where it is secured by a set screw 36. A pair of brackets 37, extending from plate 33, furnish journaled support for a pin 38 having a slot 39 through which one of the wide, shouldered ends of a test specimen 41 is passed. It will be seen that when the end of the specimen is inserted in the slot and the pin rotated, the sample will be subjected to elongation. Retrograde rotation of the pin is prevented by a pawl 42 mounted for swinging motion on a pin 43 in plate 33, and urged by a coil spring 44, surrounding pin 43, into engagement with a ratchet wheel 46 carried by pin 38. Similar elements are employed in the upper grips, with suitable variations in arrangement to provide an oppositely disposed resistance from that of the lower grips.

The support means for the upper grips, in the case of the unflexed samples, are suspended from the intermediate disc 23, while the supports for the periodically elongated samples are slidable through openings in disc 23 and upper disc 12, their ultimate support being on disc 23, as will appear. In the former case, as seen in Fig. 10, a threaded stud 46, depending through an opening in disc 23, is suspended from a nut 47 overlying the disc. A rod of thermoset plastic 48, threaded into stud 46, forms a continuation thereof and to its lower end is threaded a rod 49 having a flattened end 51, to which is pivoted by a pin 52 a link 53 of H form in cross-section. Three such suspensions are used to support a total of ten samples in each of the six groups mentioned above, the lower fork of the H link 53 surrounding an arcuate bar 54 (see Fig. 5) extending a little short of 60° of arc, and being attached to said bar by the pin 34 of the upper grip. Bar 54 is recessed as at 50 on its ends to accommodate the H link, and recessed centrally at 55 for the same purpose the central link being secured by a pin 60. Fine adjustment of the elongation of the static samples may be made by turning nut 47.

Flexing is accomplished in three groups of ten specimens each, and the means for accomplishing this is shown in Figs. 3, 6 and 7. With particular reference to Fig. 3, it will be seen that the connection with the specimen is the same as in the case of the static test, up to and including the plastic rod 48. In the flexing arrangement, however, rod 48 is attached to a reciprocating system comprising a rod 56 slidable in a bushing 57 secured by bolts 58 to disc 23, and an upper rod 59, slidable in a bushing 61, secured by bolts 62 to upper disc 12, the two rods being connected by a block 63 housing a roller 64 with anti-friction bearings 66. A first-class lever, indicated generally by the numeral 67, communicates vertically reciprocating motion from central shaft 22 to the block 63.

The lever system 67 is constructed as follows: A flanged sleeve 68, secured by a set screw 69 to central, slide shaft 22 has peripherally spaced, blind bores 71, in each of which is received and secured by a pin 72 a stud 73 on a round-ended block 74, housing a roller 76 and bearings 77. To roller 76 is secured the forked end 78 of a cylindrical rod 79, which is slidable in a tube 81. An identical rod 82 is similarly attached to roller 64, and slidably mounted in the other end of tube 81. Tube 81 provides the fulcrum of the lever system, and to this end it carries a sleeve 83 having a forked end, in each of the tines 84 of which is mounted a roller 86 with bearings 87. The rollers are attached to the respective tines 88 of an obliquely upstanding fork bracket carried by a block 89, which latter is threaded on a horizontal screw 91 carried by disc 23, the screw having its bearings in a pair of blocks 92 secured to disc 23 by screws 93. It will be seen that rotation of screw 91 will move the axis of rollers 86 along a horizontal line to vary the ratio of the lever arms and thus vary the extent of vertical travel of block 63 for the fixed stroke of shaft 22. It should be noted that sleeve 83 is threadedly mounted on sleeve 81, so that the sleeve may be moved relative to rods 79, 82, to bring tube 81 back to a position centrally of the lever system when the block 89 is moved. The sliding motion of rods 79 and 82 in tube 81 permits strictly vertical motion of the two ends of the lever system.

Since all samples in a given flexing sector of the turntable are to have the same extent of cyclic elongation, and since each such sector has three reciprocating supports, the adjustment of leverage for the three systems is conveniently accomplished simultaneously, by interconnecting means. This will be clear from Fig. 6, wherein is shown a series of interconnecting bevel gears for the three lever systems. The inner end of each screw 91 carries a gear 94 with a shank 96 secured by a pin 97. Rotation is communicated among the gears by two reversing gears 98 secured to stub shafts journaled in bearing blocks 99. A master gear 101 is mounted on a shaft journaled in a bearing block 102 and the shaft has a square end 103 adapted to receive a winding key.

For the purpose of controlling temperatures, an annular space about the path of revolution of the specimens is heat-insulated. Thus, as seen in Fig. 3, a cylindrical partition 104, attached to and extending between discs 13 and 23, confines a mass of fibrous material 106, such as asbestos, rock wool, or other material of low heat-transmission. Outwardly of the turntable, the material 106 is confined by a wall comprising an upper cylinder 107 and a lower cylinder 108, the latter having an upper, horizontal portion or shoulder 109 which defines an annular recess accommodating the test specimens and their mountings.

Attached to wall 107 and supported on an extending margin of wall portion 109 is an annular channel structure 111 holding oil 112 or other suitable liquid to provide a seal against escape of conditioned air while permitting rotation of the turntable. Extending into the oil to provide the seal, is a depending wall 113 of an inverted, annular channel member of sheet metal, the other wall 114 of which is suitably secured to the cylindrical inner wall 116 forming part of the housing for the outer body of insulation 117. Conveniently, the outer wall 118 housing this insulation is roughly octagonal in plan, as seen in Fig. 4.

Similarly, a trough is provided at the bottom of the test chamber for a second, annular oil seal in this region. Thus, an annulus of sheet metal has a depending skirt 119 attached to the inner face of wall 116, and a horizontal span 121, at the radially inner end of which is an integral channel 122 housing oil 112. The radially inner wall of this channel is secured to a cylinder 123 supported on partition 11. A cylinder 120 attached to and depending from disc 13 is immersed in the oil in trough 122 to provide the seal at the bottom of the chamber. The horizontal shelf 121 has large bores at intervals, accommodating a series of tubes such as the tubes 124 and 125 shown in Fig. 2, passing through openings in partition 11, and providing, alternately, for inlet and outlet of the controlled atmosphere. These tubes are thermally shielded from partition 11 by annular bushings 126 of insulating material.

The outer wall structure 127 of the cabinet is provided for trim only. It has no functional significance and, therefore, need not be described in detail.

On each of the four sides of the cabinet, an aperture is provided, three of these being for the purpose of viewing the test chamber, and one of which is used to subject the samples to controlled conditions of radiated light. The apertures are formed by removing rectangular sections of the several walls. Thus, in Fig. 3, wall 116 has an opening 128, wall 118 has an opening 129, and outer wall 127 has an opening 131. It will be noted that the aperture in wall 118 is cut to such a size as to provide the horizontal and vertical walls 132, 133, respectively, forming the end closures for insulation 117 at the window frame.

Closing each window frame or opening is a sash member, indicated generally by the numeral 134, and having two spaced panes of glass 136. The particular form of sash employed has no bearing on the invention. Therefore, and since the structural details of the sash shown in the drawings are more or less self-explanatory, detailed description thereof is not necessary.

The moving parts are actuated by mechanism located in the bottom of the cabinet, which mechanism is shown in Fig. 11. A motor 137 carries a worm 138 engaging a worm gear 139 keyed to a countershaft 141 journaled in flanged bushings 142, 143, secured, respectively, to the base 144 of the apparatus, and the partition 11. Rotation of shaft 141 is communicated to the central shaft assembly of the turntable by a belt 146 engaging a pulley 147 on shaft 141 and a pulley 148 secured by bolts 149 to the threaded, lower end 151 of bushing 21, the end being threaded to accommodate a locking nut 152 cooperating with a washer 153.

Reciprocation of shaft 22 is also effected by motor 137, the drive being communicated through belts 154 to a variable speed transmission unit 156, and from thence by belts 157 to a shaft 158 journaled in a pair of pillow blocks 159 mounted on a pair of pedestals 161 supported on the base 144. At its left end, shaft 158 carries a disc 162 with a headed crank pin 163, on which is pivoted a link 164, the upper end of which is pivoted on trunnions 166, secured by bolts 167 to a collar 168 secured on the threaded, reduced lower end of reciprocating shaft 22 by a nut 169 and lock washers 171.

Referring to Fig. 1, for a brief description of the temperature control, there is shown an insulated cabinet 172 adapted to hold Dry Ice or other coolant. Circulation from this cabinet to the test cabinet and return is provided for in an outlet duct 173 and an inlet duct 174, the air being moved by a blower, housed within a closure 176 on the cabinet, the blower being actuated by a motor 177 and a belt enclosed in housing 178.

A heat source is contained in a housing 179 having an outlet conduit 181 and an inlet conduit 182 communicating, respectively, with conducits 173, 174. Valves 183, 184 are operative to selectively place either the low temperature source or the high temperature source in communication with the test cabinet, or to shut off both these sources. The hot air is circulated by a blower contained in a housing 186 and operated by a motor 187. It will be understood that conduits 173 and 174 communicate with the several inlet and outlet tubes 124, 125 by means of a manifold arrangement (not shown). Obviously, suitable temperature control means will be included in the test chamber. In like manner an atmosphere of controlled humidity may be circulated.

For controlled, ozonized air, additional conduits 188, 189, connected to a suitable source of ozone control, lead into the cabinet and are suitably connected to the manifolds.

One of the windows of cabinet 10 is provided with a mounting 191 for a housing 192, adapted to hold lamps for furnishing radiation of the desired intensity and wave length.

It is believed that the operation will be obvious in the light of the foregoing description. For a given run, the test specimens are mounted in the several pairs of grips in various conditions of elongation, both for the groups which are cyclically stretched and those whose elongation is not varied during the test run. Besides the variation in initial elongation, the flexed samples have varied degrees of maximum elongation. It will be seen that the apparatus thus provides a wide variety of conditions of stress in the samples, all under identical conditions of "weathering," which affords an elaborate set of reliable data for analyzing the factors concerned in weathering. In addition, the identical conditions of stress may be duplicated on samples of identical composition and properties, for exposure in various atmospheres or to various radiation.

While a certain preferred embodiment of the invention has been shown and described, the same is not limited thereto, but only as shall appear from the spirit and scope of the appended claims.

What is claimed is:

1. Test apparatus for exposing rubber test strips to various atmospheric conditions while holding said strips in various degrees of elongation comprising a table adapted to rotate to pass its edges in continuing sequence past a number of test positions having different atmospheric characteristics, means on said table for simultaneously supporting a plurality of strips of material in various degrees of elongation of some of said strips while said table is rotating comprising a clamp on said table for clamping an end of said test strip, an element mounted for reciprocation axially of said table, a reciprocating member adapted for sliding motion parallel to the axis of said table and adapted at one end to hold the other end of the strip, levers arranged radially of said table and each having one end pivotally connected to said element and the other end pivotally connected to one of said members, and actuating means mounted at one end of said reciprocating element and adapted to impart reciprocation to said element whereby said member is reciprocated to periodically stretch and relax said strip.

2. Apparatus for testing strips of rubber-like materials comprising a rotatable table designed to present its edge portions in continuing timed sequence to a number of atmospherically different test stations, means to rotate the table, a plurality of clamps on said table for holding one end of said strips, means adapted for sliding action parallel to the axis of said table including slide members adapted for holding the other ends of the strips in order to periodically vary the elongation of some of said strips while said table is rotating, an element mounted axially of said table for reciprocation through the plane of said table, means to reciprocate said element axially to said table, levers arranged radially of said table and pivotally connected at one end to said element and at the other end to the slide members, said levers having medial portions slidable with respect to said end portions and pivoted on fulcrums whereby the reciprocation of the element pivots the levers on the fulcrums and reciprocates the slides to periodically stretch and relax the strips, and means to adjust the position of said fulcrums radially with respect to said element.

3. Apparatus for testing strips of rubber-like materials comprising a rotatable table designed to present its edge portions in timed sequence to a number of atmospherically different test stations, means to rotate the table, a plurality of clamps on said table for holding one end of said strips, means adapted for sliding action parallel to the axis of said table including slide members adapted for holding the other ends of the strips in order to periodically vary the elongation of some of said strips while said table is rotating, an element mounted axially of said table for reciprocation through the plane of said table, means to reciprocate said element axially to said table, levers arranged radially of said table and pivotally connected to one end to said element and at the other end to the slide members, said levers having medial portions slidable with respect to said end portions and pivoted on fulcrums whereby the reciprocation of the element pivots the levers on the fulcrums and reciprocates the slides to periodically stretch and relax the specimen.

4. Apparatus for testing strips of rubber-like material comprising a stationary radially annular outer shell having radially inwardly projecting sides, a radially annular inner shell having radially outwardly projecting sides and adapted for rotation about its axis, means for rotating said inner shell, the edges of the sides of said inner shell overlapping the edges of the sides of said outer shell in movable relation to define an annular test chamber, means for sealing said overlapping edges in airtight relation, a sliding member extending through one side of the inner shell and adapted for reciprocating action parallel to the axis of the inner shell, the end of said member within the chamber adapted for holding one end of said strip, means on said inner shell in said chamber for clamping the other end of said strip, the walls of at least one of the shells relieved in part to define inlet openings for said chamber spaced circumferentially and adapted to introduce test atmospheres into said chamber, and means for reciprocating said member whereby said rotating inner shell presents said strips sequentially to said atmospheres as the strips are elongated and relaxed by the reciprocating action of said member.

References Cited in the file of this patent

UNITED STATES PATENTS

| | | |
|---|---|---|
| 1,595,318 | Shields | Aug. 10, 1926 |
| 1,923,296 | Castricum | Aug. 22, 1933 |
| 2,157,092 | Allen et al. | May 9, 1939 |
| 2,404,584 | Liska et al. | July 23, 1946 |
| 2,429,481 | Mohr et al. | Oct. 21, 1947 |
| 2,450,880 | Chatten et al. | Oct. 12, 1948 |
| 2,467,129 | Huber | Apr. 12, 1949 |
| 2,523,322 | Ornstein et al. | Sept. 26, 1950 |